United States Patent [19]
Colaianna et al.

[11] Patent Number: 5,608,020
[45] Date of Patent: Mar. 4, 1997

[54] PROCESS FOR PREPARING TETRAFLUOROETHYLENE COPOLYMERS WITH OTHER PERFLUORINATED MONOMERS

[75] Inventors: Pasqua Colaianna, Milan; Julio A. Abusleme, Saronno; Natalino D. Fanti, Milan, all of Italy

[73] Assignee: Ausimont S.p.A., Milan, Italy

[21] Appl. No.: 475,983

[22] Filed: Jun. 7, 1995

Related U.S. Application Data

[62] Division of Ser. No. 323,350, Oct. 14, 1994.

[30] Foreign Application Priority Data

Oct. 15, 1993 [IT] Italy ................... MI93A2197

[51] Int. Cl.$^6$ ...................................... C08F 2/00
[52] U.S. Cl. .................... 526/206; 526/247; 526/254
[58] Field of Search .............................. 526/206

[56] References Cited

U.S. PATENT DOCUMENTS

| | | | |
|---|---|---|---|
| 3,085,083 | 4/1963 | Schreyer | 260/87.5 |
| 4,743,658 | 5/1988 | Inbalzano et al. | |
| 4,864,006 | 9/1989 | Giannetti et al. | 527/209 |
| 5,115,038 | 5/1992 | Ihara et al. | |
| 5,180,803 | 1/1993 | Gibbard | 526/214 |

FOREIGN PATENT DOCUMENTS

| | | |
|---|---|---|
| 0220910 | 5/1987 | European Pat. Off. . |
| 0247379 | 12/1987 | European Pat. Off. . |
| 0250767 | 1/1988 | European Pat. Off. . |
| 0457255 | 11/1991 | European Pat. Off. . |
| 0518073 | 12/1992 | European Pat. Off. . |
| 0545173 | 6/1993 | European Pat. Off. . |
| 0805115 | 11/1958 | United Kingdom . |
| 805115 | 11/1958 | United Kingdom ............ 526/206 |

OTHER PUBLICATIONS

Hackh's Chemical Dictionary –May 27, 1981 p. 240.

*Primary Examiner*—Joseph L. Schofer
*Assistant Examiner*—N. Sarofim
*Attorney, Agent, or Firm*—Bryan Cave L.L.P.

[57] ABSTRACT

The invention relates to a process for obtaining copolymers of tetrafluoroethylene with one or more perfluorinated monomers having ethylenic unsaturation, said copolymers having only carboxylic or carboxylate groups as unstable end groups, by polymerization in aqueous emulsion in the presence of a dispersing agent. The process is characterized in that $CHF_2$—$CH_3$ is used as chain transfer agent, and an inorganic peroxidic compound is used as initiator.

The carboxylic or carboxylate groups are successively transformed into stable groups of the —$CF_2H$ type by known stabilizing treatments.

10 Claims, No Drawings

PROCESS FOR PREPARING TETRAFLUOROETHYLENE COPOLYMERS WITH OTHER PERFLUORINATED MONOMERS

This is a divisional of U.S. application Ser. No. 08/323,350, filed Oct. 14, 1994.

The present invention relates to a process for preparing tetrafluoroethylene copolymers with other perfluorinated monomers, having very high chemical and thermal stability.

In the preparation of tetrafluoroethylene copolymers with other perfluorinated monomers by polymerization in aqueous emulsion, peroxidic initiators, chain transfer agents and dispersing agents are used.

It is known that both the peroxidic initiator and the chain transfer agent give rise to the formation of unstable end groups in the polymeric chains.

These unstable groups can cause problems during polymer processing, with subsequent formation of bubbles in articles or colouring of the same. Moreover phenomena of $F^-$ release from the handmade article (pipes, electronics components) can occur; for the applications where a high purity degree of the above copolymers is required, it is therefore necessary to reduce as much as possible the amount of the unstable end groups.

It is known that by using an inorganic persulphate as initiator, unstable carboxylic end groups (—COOH) and/or carboxylate (—COO$^-$) end groups are obtained.

The chain transfer agent can give rise to different unstable end groups depending on its chemical nature. For instance, methanol forms unstable —COOCH$_3$ and —CH$_2$OH groups (see European patent application 457,255); methane gives unstable —CF$_2$—CH$_3$ groups (see European patent application 220,910). Methane presents, on the other hand, the inconvenience that, in its industrial use, it is to be employed in high amounts, with consequent utilization of high partial pressures causing a lower polymerization rate, with decrease in plant productivity.

The polymers with unstable end groups are to be submitted to different treatments in order to obtain stable end groups. At least one treatment with fluorine is generally carried out at high temperatures (commonly at 100°–190° C).

When unstable end groups of different types are obtained (for instance —COOH, —COOCH$_3$ and —CH$_2$OH), the stabilization treatment requires two subsequent stages, as described in the already cited European patent application 457,255.

For the purposes of the present invention, a tetrafluoroethylene copolymer with other perfluorinated monomers is considered to be stable if an article obtained from such copolymers shows a low $F^-$ release (lower than 2 ppm) in a mixture of water with methanol and if the HF developed from the article, at high temperature, is low (lower than 50 ppm), according to methods which are described hereinunder.

The Applicant has found that the stabilization with fluorine does not give satisfactory results despite the absence of —COOH and —COF end groups in the stabilized products, since such a treatment gives rise to a $F^-$ release of undesirable size, at room temperature.

European patent application 545,173 suggests the use of CF$_3$—CH$_2$F.(HFC 134a) as chain transfer agent in TFE (tetrafluoroethylene) homopolymerization and copolymerization in aqueous dispersion. Such transfer agent causes a considerable decrease in the polymerization rate, with consequent decrease in plant productivity.

Experimental work carried out by the Applicant has shown that the unstable terminals obtained with this transfer agent are of different type (—COOH and —CF=CF$_2$), whose stabilization requires in any event a treatment with fluorine.

An object of the present invention is to provide a process for emulsion copolymerization of TFE with other perfluorinated monomers, using a chain transfer agent which decreases the polymerization rate to a very limited extent, also when copolymers with relatively low molecular weights are to be prepared.

A further object is to provide a process wherein the transfer agent gives unstable end groups, all of the same kind and equal to the ones deriving from the initiator, whereby the stabilization treatment can be effectively carried out in only one stage.

A further object is to provide a process wherein the stabilization can be carried out, when wished, during the polymerization itself, giving rise to stable —CONH$_2$ end groups.

It has been surprisingly found that by using CHF$_2$—CH$_3$ (HFC 152a) as chain- transfer agent in the above emulsion copolymerization in the presence of a dispersing agent, this HFC gives only carboxylic (—COOH) or carboxylate (—COO$^-$) groups, as unstable end groups, whereby by using an initiator giving only the above said unstable end groups, i.e. an inorganic peroxydic compound, the obtained copolymers contain, as unstable groups, only carboxylic or carboxylate groups. This result was quite surprising since it would have been expected that a chain transfer agent of formula CHF$_2$—CH$_3$, rich in hydrogen atoms, had given unstable end groups rich in hydrogen.

It has also been surprisingly found that 152a has a limited effect on the polymerization rate.

A first object of the present invention consists in a process for obtaining tetrafluoroethylene copolymers with one or more perfluorinated monomers with ethylenic insaturation, said copolyemrs having only carboxylic groups or carboxylate groups as unstable end groups, by polymerization in aqueous emulsion in the presence of a dispersing agent. This process is characterized in that it is used, as chain transfer agent, the asymmetric difluoroethane CHF$_2$—CH$_3$, in amounts from 0.55 to 30% by moles with respect to the tetrafluoroethylene mixture with the other perfluorinated monomer or monomers, and an inorganic compound, as initiator.

Among the above said fluorinated comonomers we can cite:

perfluoroalkenes, such as, for instance, hexafluoropropene;

perfluoroalkylvinylethers such as, for instance, perfluoropropylvinylether;

perfluorodioxols, obtaining the copolymers described in the Italian patent application MI93 A 001445 of the same Applicant;

perfluoromethylvinylether in combination with other linear or cyclic perfluoroalkylvinylethers containing one or more ether oxygen atoms, obtaining the copolymers described in the Italian patent application MI93 A 001444 of the same Applicant.

The copolymers obtainable with the above said process usually contain from 0.05 to 10% by moles of the above comonomers.

The amount of 152a is preferably comprised between 0.55 and 10% by moles (and, more preferably, between 1 and 10%) with respect to the mixture of perfluorinated monomers.

The inorganic peroxidic compounds are selected in particular from sodium or potassium persulphate, peroxide, and percarbonate. Preferably sodium or potassium persulphate is used. The amount of peroxidic compound used depends, as known, on temperature and, in general, on reaction conditions. The amount of peroxidic compound is usually comprised between 0.01 and 2% by weight with respect to the monomers mixture.

The dispersing agent is selected, in particular, from sodium or potassium salts of perfluoroalkylcarboxylic acids (for instance perfluorocaprylic acid) and sodium or potassium salts of perfluoroalkoxyether acids.

The amount of such dispersing agents is commonly comprised between 0.05 g and 10 g per liter of water present in the dispersion.

Preferably, the polymerization is carried out in the presence of a base or of a basic salt soluble in water, utilized in such amounts as to assure a pH equal or higher than 7. By operating in the presence of, such substances, all the unstable end groups are present as carboxylate groups ($COO^-$). To this purpose sodium or potassium basic salts are preferably used, which are capable of maintaining, during the polymerization, a pH generally comprised between 7 and 10, and, preferably, between 7 and 8. Suitable salts are, in particular, sodium or potassium tetraborate, nitrate, nitrite, bisulphite, sulphate and sulphite.

Alternatively, the polymerization can be carried out in the absence of such substances, therefore all the unstable terminals are present as carboxylic groups (—COOH) at the polymerization end. In such a case, it is necessary to transform successively the carboxylic groups into carboxylate for polymer treatment with a base or a sodium or potassium basic salt until a pH comprised between 7 and 8 is reached in the latex.

The polymerization is perferably carried out in the presence of perfluoropolyethers having perfluoroalkyl end groups. Such perfluoropolyethers can be added to the reaction medium in the form of aqueous emulsion in the presence of a perfluorinated dispersing agent, as described in European patent application 247,379 or, preferably, in the form of aqueous microemulsion, always in the presence of a perfluorinated dispersing agent, as described in U.S. Pat. No. 4,864,006.

The polymerization is generally carried out at a temperature comprised between 20° and 100° C., and, preferably, between 55° and 95° C. at a pressure comprised between 10 and 40 atm.

The stabilization treatment of the polymer having, as unstable end groups, —COO⁻ groups, can be carried out with the known methods (described in the U.S. Pat. Nos. 3,085,083 and 5,180,803), capable of transforming such groups into stable —$CHF_2$ groups.

A thermal treatment of the dispersion having a pH comprised between 7 and 8 is preferably carried out at temperatures comprised between 180° and 300° C., by contemporaneously achieving the transformation, by decarboxylation, of $CF_2$—COO⁻ groups into stable —$CF_2H$ groups and the coagulation of the copolymer. The thermal treatment is preferably carried out at temperatures comprised between 200° and 280° C. At I.R. analysis the stabilized copolymers result free from unstable end groups.

Another embodiment of the present invention, which utilizes the same inventive concepts, allows to obtain, directly in the polymerization, stable —$CONH_2$ end groups. According to this embodiment, the process is carried out in the same conditions, by using a base or a basic salt as defined above, and additionally ammonia in aqueous solution in excess with respect to the stoichiometric amount necessary to transform all the end groups —COO— into —$CONH_2$. According to this embodiment, the pH of the dispersion is kept, during the polymerization, at values generally comprised between 7 and 9. The so obtained copolymers result at the I.R. analysis free from unstable end groups.

By using this last process, it is preferable that a part, or even better, all the counter-ions of the dispersing agent, of the initiator and of the base or basic salt be $NH_4^+$ ions.

The present invention applies also to the following copolymers:

ethylene-tetrafluoroethylene, with —COOH or —$CONH_2$ end groups;

polyvinylidene fluoride, with —$CONH_2$ end groups;

copolymers or terpolymers based on VDF containing TFE and/or HFP, optionally modified with perfluoroalkylvinylethers and with olefins (as described in European patent application 518,073 of the same Applicant), with —$CONH_2$ end groups;

ethylene-chlorotrifluoroethylene copolymers, with —COOH or —$CONH_2$ end groups.

The following examples are given for illustrative purposes and cannot be construed as limitative of the scope of the present invention.

The IR analysis of the end groups and the evaluation of the chemical stability of the copolymers were carried out as follows:

IR Analysis

The determination of the end groups is carried out on films obtained by molding a pellet of the product at room temperature. The films are examined in a spectrometer I.R. Nicolet 20 SX Fourier Transform Infrared.

As reference material, it is used a polymer having only fluorinated paraffinic end groups, obtained by complete fluorination.

This material is treated and examined in a similar way as the sample to be examined and its absorption spectrum is subtracted from the spectrum of the sample, utilizing the Nicolet software program.

The additional band (overtone) of the —$CF_2$ groups at 2367 cm⁻¹ is utilized to compensate the difference of thickness between the film of the sample and of the reference. The difference spectrum is examined in the range from 4000 to 2700 cm⁻¹ and from 2000 to 1500 cm⁻¹ and the optical density of the end groups is measured at their absorption wave-length.

The concentration of the end group is calculated with the following formula:

$$C = \frac{D \times S}{W \times E}$$

wherein

C is the concentration of the end group (moles $Kg^{-1}$)

D is the optical density of the absorption band of the group

S is the film surface ($cm^2$)

W is the film weight (g)

E is the molar extraction coefficient of the group ($cm^{-1}$ $moles^{-1}$).

The coefficients of molar extinction are calculated using standard compounds.

Content in Extractable Fluorine

For determining the content in extractable fluorine, a spiral is made by injection molding at 380° C. The size of the section of the spiral is 6×4 mm. The spiral is subsequently cut every 6 cm.; 10 g of pieces are put in a polyethylene bottle, in which 10 ml of a mixture of water/methanol in volume ratio 1:1, are added; then 10 ml of a TISAB ionic strength correcting fluid are further added. The presence of methanol makes easier the extraction of fluoride ion from the sample. The alcoholic mixture is submitted to mild stirring for 24 hours; the concentration of fluoride ion is then determined directly on the mixture by using an ion-specific electrode previously calibrated. The method is applicable to samples with content in hydrolyzable fluorine >1 mg/kg; the values of hydrolyzable fluorine lower than 1 ppm are determined by ionic chromatrography.

HF Evolution at High Temperature

A sample of pellets of about 200 mg is introduced in a sampleholder of an oven Adamel Lhomargy. The sample is left for 2 h at 360° C. in a dry nitrogen flow and the developed gas is collected in an alkaline solution. The determination of $F^-$ in the collected solution is carried out by ionic chromatography.

Melt Flow Index Determination

The MFI (melt flow index) was determined according to ASTM D 3307-86 standard in Examples 1–4 and 9 and according to ASTM D 1238-65T standard in Examples 5–8.

EXAMPLE 1

This example illustrates, for comparative purposes, the use of a chain transfer agent ($CHCl_3$) not in accordance with the present invention in the preparation of a TFE-perfluoropropylvinylether (FPVE) copolymer.

A 5 l chromium plated AISI steel autoclave was utilized, equipped with a stirrer working at 650 rpm. After evacuation there are sequentially introduced 3 l of demineralized water, FPVE in an amount of 3.7 g/l $H_2O$, and $CHCl_2$ in an amount of 1.23 g/l $H_2O$ and, subsequently, a perfluoropolyether microemulsion (prepared as described in Example 1 of U.S. Pat. No. 4,864,006) so as to have 2 g/l $H_2O$ of surfactant. The autoclave is brought to the working temperature of 75° C. and then to 20 bar absolute pressure with a mixture of TFE-FPVE, the molar ratio TFE/FPVE being 54.55/1. When the working pressure is reached, a 0.0032 molar solution of potassium persulphate (KPS) is continuously fed. The polymerization pressure is kept constant by feeding the previous mixture.

After a reaction time of 210 minutes, 1530 g of polymer are obtained. The reactor is cooled to room temperature, the emulsion is discharged and coagulated by addition of $HNO_3$ having 65% concentration. The polymer is separated, washed with $H_2$ and dried.

By IR analysis the following end groups were identified: —COOH, —$CONH_2$ and CF—CF =$CF_2$. By gas-mass spectroscopy it is furthermore evident the presence of chlorinated terminals.

The data relating to MFI, to the polymerization rate and to the copolymer stability are reported in Table 1.

EXAMPLE 1A

The polymer obtained according to Example 1 is subjected, for comparative purposes, to a stabilization process with $F_2$: more precisely, the powder obtained in Example 1 is fluorinated for 6 h at the temperature of 140° C. The fluorescence and the mass spectroscopy show the presence of chlorinated groups. The IR analysis shows the disappearance of —COOH, —$CONH_2$ and CH=$CF_2$ groups.

The data relating to MFI, polymerization rate and chemical stability are reported in Table 1.

EXAMPLE 2

The same reactor as in Example 1 is used. The synthesis conditions, such as temperature and pressure, loading and charged PFVE and fed mixture, are equal to those of Example 1. The amount of perfluoropolyether microemulsion is equal to that of Example 1, with the difference that the surfactant was salified with KOH instead of $NH_3$. The molarity of KPS solution is 0.012 molar. Moreover 2.33 g/l $H_2O$ of decahydrated sodium tetraborate are introduced. Once the polymerizati temperature is reached, an amount of 152a ($CF_2HCH_3$) corresponding to 2.5 absolute bar is charged. After 116 minutes, 1400 g of polymer have been produced; a part of the latex is coagulated by addition of $HNO_3$ and then dried. The IR analysis is reported in Table 2.

The data relating to MFI, polymerization rate and chemical stability are reported in Table 1.

EXAMPLE 2A

The latex obtained in Example 2 was firstly neutralized with a nitric acid solution up to pH 7 and then was introduced into a 5 l autoclave with a solid/aqueous phase ratio of 20% by weight.

The autoclave was brought to a temperature of 250° C. When this temperature was reached, the heating treatment lasted about 1 h; then the system was cooled and the polymer already coagulated was discharged. The moist powder was washed and dried and extruded. Table 2 reports the data relating to IR analysis. Table 1 reports the data relating to the partial pressure of the chain transfer agent, MFI, polymerization rate and chemical stability.

TABLE 1

| Example No. | Chain transfer agent | Percentage by moles of transfer agent | MFI (g/10') | Polymerization rate (g polymer/liter of water per minute) | HF ppm | Extractable $F^-$ ppm |
| --- | --- | --- | --- | --- | --- | --- |
| 1 | $CHCl_3$ | not determined | 13 | 2.2 | 180 | 5 |
| 1a | $CHCl_3$ | | 13 | 2.2 | 20 | 10 |
| 2 | 152a | 2.6% | 12.8 | 3.8 | 800 | 3 |
| 2a | 152a | | 12.8 | 3.8 | 10 | 1.8 |

TABLE 2

| Example No. | —CF$_2$H | —COOH | —CF=CF$_2$ | —CONH$_2$ |
|---|---|---|---|---|
| 1 |  | 3.1.10$^{-3}$ | 6.10$^{-4}$ | 1.0.10$^{-4}$ |
| 1A |  | absent | absent | absent |
| 2 | 2.4.10$^{-3}$ | 6.10$^{-4}$ | absent | absent |
| 2A | 5.1.10$^{-3}$ | absent | absent | absent |

EXAMPLE 3

A 5 l chromium plated AISI 316 steel autoclave, equipped with a stirrer working at 684 rpm, was utilized. It was operated as in example 2, except for the absence of borax and for the use of a different partial pressure of 152a, which was 1.6 bar. After 77 minutes, 1500 g of polymer were produced. Table 3 reports the main data on the synthesis and on the polymer characterization. IR analysis shows the presence of carboxylic groups.

EXAMPLE 4

It was operated as in example 3, with the difference that a chain transfer agent not in accordance with the present invention was used for comparative purposes: 1,1,1,2 tetrafluoroethane (HFC 134a). The partial pressure reached in autoclave is 5 bar. After 85 minutes 1510 g of polymer were produced. Table 3 reports the main data on the synthesis and on the polymer characterization.

IR analysis shows the presence of the following end groups:

CF$_2$H: absent
COOH: 4.4 10$^{-3}$ moles/Kg
CF$_2$=CF$_2$: 1.1 10$^{-3}$ moles/Kg
CONH$_2$: 1 10$^{-4}$ moles/Kg

TABLE 3

| Example No. | Chain transfer agent | Percentage by moles of transfer agent | Partial pressure of chain transfer agent | MFI (g/10') | Polymerization rate (g polymer/ liter of water per minute) |
|---|---|---|---|---|---|
| 3 | 152a | 1.5 | 1.6 | 2.2 | 6.26 |
| 4 | 134a | 5 | 5 | 1,2 | 5.69 |

EXAMPLE 6

This example illustrates, for comparative purposes, the preparation of a TFE copolymer with C$_3$F$_6$ (HFP) without using a chain transfer agent.

8 ml of a perfluoropolyether (Galden$^{(R)}$ LS produced by Ausimont S.p.A.) of general formula:

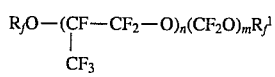

(where R$_f$, R$_f^1$=CF$_3$—, C$_2$F$_5$,—C$_3$F$_7$—) having a n/m ratio of 40 and an average number molecular weight of 800, are added to 250 ml of distilled water. The suspension is stirred for 5 min with stirrer Ultraturrax$^{(R)}$ Mod. T65 of the company Ika Werke. An aqueous solution containing 4 g of a perfluoro polyether surfactant is then added, having formula:

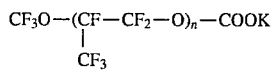

having acidimetric molecular weight of 690. The so obtained emulsion is further homogenized for 5 min and then charged into a 4.2 l AISI 316 steel autoclave wherein the vacuum was previously made. Distilled water is then added up to a total volume of 2000 ml.

The reactor temperature is brought to 95° C. The reactor is then pressurized at 20 atm with a gaseous mixture containing 62% by moles of C$_3$F$_6$ and 38% by moles of TFE. 62 ml of a solution obtained by dissolving in 500 ml of water 1.46 g of KPS (sodium persulphate) are then introduced into autoclave. As soon as the reactor pressure tends to decrease, it is restored by feeding by means of a compressor a gaseous mixture HFP/TFE containing 7.6% by moles of HFP. After 15', the same above mentioned KPS solution is fed with a flow rate of 88 ml/h.

After 65' stirring is stopped and the reactor is discharged. An aqueous dispersion containing 230 g/l of a polymeric resin is obtained. The dispersion is coagulated by mechanical stirring and filtered. The solid is repeatedly washed with distilled water and dried in ventilated stove at 200° C. 520 g of copolymer having a MFI of 0.5, determined according to ASTM D1238-65T standard (weight 5 kg, 372° C.), are obtained.

EXAMPLES 6–8

It was operated as in Example 1 in the presence of 152a as chain transfer agent, but with different partial pressures. The results are reported in Table 4.

EXAMPLE 9

The example relates to the preparation of a TFE-FPVE copolymer having stable —CONH$_2$ end groups.

A 5 l chromium plated AISI 316 steel autoclave equipped with a stirrer working at 650 rpm was utilized. After the evacuation, 3 of demineralized water, FPVE in an amount of 3.7 g/l H$_2$O and 0.67 g/l H$_2$O of sodium decahydroxide tetraborate and 1.6 ml/l H$_2$O of a NH$_3$solution at 28% and at last the perfluoropolyether emulsion (prepared as described in Example 1 of European patent application 250,767), are sequentially introduced so as to have 2 g/l H$_2$O of surfactant. The autoclave is brought to the working temperature of 75° C.; 3 bar of 152a (corresponding to 3% by moles) are then charged; lastly the system is brought to an absolute pressure of 20 bar with a TFE-FPVE mixture, the molar ratio TFE/PFVE being 54.55/1. Once the working pressure is reached, a 0.0062 molar solution of potassium persulphate (KPS) is continuously fed. The polymerization pressure is kept constant, feeding the previous mixture.

After a reaction time of 190 minutes, 1400 g of polymer are obtained. The reactor is cooled to room temperature, the emulsion is discharged and coagulated by addition of HNO$_3$ at 65% concentration. The polymer is separated, washed with $H_2O$ and dried.

The data relating to synthesis and characterization of the polymer are the following:

MFI (g/10'): 7

Polymerization rate (polymer g/liter of water per minute): 2.25

TABLE 4

| Example No. | Chain transfer agent | Partial pressure of chain transfer agent (atm) | Percentage by moles of the transfer agent | MFI (g/10') | Polymerization rate (polymer g/ liter of water per minute) |
| --- | --- | --- | --- | --- | --- |
| 5 | without | — | | 0.5 | 4.7 |
| 6 | 152a | 0.26 | 1% | 1.9 | 3.9 |
| 7 | 152a | 0.53 | 2% | 2.4 | 3.6 |
| 8 | 152a | 1.05 | 4% | 5.8 | 3.2 |

We claim:

1. A process for obtaining tetrafluoroethylene copolymers with one or more perfluorinated monomers having ethylenic unsaturation, said copolymers being free from unstable end groups and having stable end groups —$CONH_2$, by polymerization in aqueous emulsion in the presence of dispersing agents, characterized in that the polymerization is carried out in the presence of:

(1) $CHF_2$—$CH_3$, in an amount from 0.55 to 30% by moles with respect to the mixture of tetrafluoroethylene with the other perfluorinated monomer or monomers, as a chain transfer agent;

(2) an inorganic peroxidic compound;

(3) a base or a basic salt in such an amount as to maintain the pH at values comprised between 7 and 9 during the polymerization;

(4) an aqueous ammonia solution such that the amount of ammonia is in excess compared to the stoichiometric amount necessary to change all the end groups $COO^-$ coming from the chain transfer and from the initiator into —$CONH_2$ groups.

2. Process according to claim 1, characterized in that the amount of $CHF_2$—$CH_3$ is comprised from 0.55 to 10% by moles with respect to the mixture of tetraflouroethylene with the other flourinated monomer or monomers.

3. Process according to claim 1, characterized in that ammonium persulphate is used as inorganic peroxidic compound; an ammonium basic salt is used as base or basic substance; and an ammonium salt of a perfluoroalkylcarboxylic acid or of a perfluoroalkoxyethereal acid is used as dispersing agent.

4. Process according to claims 1, characterized in that the polymerization is carried out in the presence of an aqueous emulsion or microemulsion of perfluoropolyethers having perfluoroalkyl end groups, using, as dispersing agent, a perfluorinated dispersing agent.

5. A process for obtaining tetrafluoroethylene copolymers with one or more perfluorinated monomers having ethylenic unsaturation, the copolymers being without unstable end groups and having stable —$CF_2H$ end groups, which comprises: P1 a) carrying out the polymerization in an aqueous dispersion in the presence of i) dispersing agents;

ii) asymmetric difluoroethane $CHF_2$—$CH_3$, used as a chain transfer agent in an amount between 0.55 and 30% by moles with respect to the mixture of tetrafluoroethylene and the monomer or monomers;

iii) an inorganic peroxidic compound as initiator; and iv) a base or a basic salt in an amount such that, at the conclusion of the polymerization, all of the unstable end groups are carboxylate groups;

b) bringing the aqueous dispersion to a pH between 7 and 8; and P1 c) submitting the aqueous dispersion to a thermal treatment at a temperature from 180° C. to 300° C.

6. The process according to claim 5, wherein the basic salt is a sodium or potassium basic salt.

7. The process according to claim 5, wherein the base or the basic salt is used in an amount such that the pH is maintained between 7 and 10 during the polymerization.

8. The process according to claim 5, wherein the inorganic peroxidic compound is sodium or potassium persulfate.

9. The process according to claim 5, wherein the dispersing agent is selected from the group consisting of sodium or potassium salts of perfluoroalkylcarboxylic acids and of perfluoroalkoxyethereal acids.

10. The process according to claim 5, wherein the polymerization is carried out in the presence of an aqueous emulsion or microemulsion of perfluoropolyethers having perfluoroalkyl end groups, using a perfluorinated dispersing agent.

* * * * *

UNITED STATES PATENT AND TRADEMARK OFFICE
CERTIFICATE OF CORRECTION

PATENT NO. : 5,608,020
DATED : March 4, 1997
INVENTOR(S) : Pasqua Colaianna

It is certified that error appears in the above-identified patent and that said Letters Patent is hereby corrected as shown below:

On the title page, item [75]: Delete: "Natalino D. Fanti"
Insert: --Natalino Del Fanti--

Column 10, Lines 4-5: Delete: "copolymer s"
Insert: --copolymers--

Column 10, Line 21: Delete: "P1"

Column 10, Line 33: Delete: "P1"

Signed and Sealed this

Twenty-third Day of December, 1997

Attest:

Attesting Officer

BRUCE LEHMAN

Commissioner of Patents and Trademarks